United States Patent
Tsukamoto (10) Patent No.: US 12,270,678 B2
(45) Date of Patent: Apr. 8, 2025

(54) APPARATUS, METHOD, AND COMPUTER PROGRAM FOR GENERATING LANE NETWORK

(71) Applicant: TOYOTA JIDOSHA KABUSHIKI KAISHA, Toyota (JP)

(72) Inventor: Mamoru Tsukamoto, Tokyo-to (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 182 days.

(21) Appl. No.: 18/159,154

(22) Filed: Jan. 25, 2023

(65) Prior Publication Data
US 2023/0296400 A1 Sep. 21, 2023

(30) Foreign Application Priority Data
Mar. 15, 2022 (JP) .................................. 2022-040505

(51) Int. Cl.
*G01C 21/00* (2006.01)
(52) U.S. Cl.
CPC ................................ *G01C 21/3815* (2020.08)
(58) Field of Classification Search
None
See application file for complete search history.

(56) References Cited

U.S. PATENT DOCUMENTS

| | | | |
|---|---|---|---|
| 2018/0148052 A1* | 5/2018 | Suto | ..................... B60W 40/06 |
| 2020/0073396 A1 | 3/2020 | Shimizu | |
| 2023/0127185 A1* | 4/2023 | Jeong | ................. G01C 21/3807 |
| | | | 701/25 |

FOREIGN PATENT DOCUMENTS

| | | | |
|---|---|---|---|
| JP | 2007-164339 A | 6/2007 |
| JP | 2010-026875 A | 2/2010 |
| JP | 2018-105636 A | 7/2018 |
| JP | 2020-032994 A | 3/2020 |
| JP | 2020075561 A | 5/2020 |
| JP | 2020109421 A | 7/2020 |

* cited by examiner

*Primary Examiner* — Yufeng Zhang
(74) *Attorney, Agent, or Firm* — Dickinson Wright, PLLC (57) ABSTRACT

An apparatus for generating a lane network includes a processor configured to calculate, for each of individual points in a predetermined region connecting an entry lane and an exit lane, a probability distribution indicating a probability that the point lies on a standard trajectory, based on trajectories of one or more vehicles that traveled through the region, generate two virtual borders each connecting the positions of respective edges of the entry lane and the exit lane, set, of the individual points in the predetermined region, at least two points that lie between the two virtual borders and at which the variance of the probability distribution is not greater than a predetermined variance threshold, as control points, and generate a Bézier curve, based on the at least two control points, as a line connecting two lanes in the predetermined region in a lane network.

4 Claims, 6 Drawing Sheets

APPARATUS, METHOD, AND COMPUTER PROGRAM FOR GENERATING LANE NETWORK

FIELD

The present invention relates to an apparatus, a method, and a computer program for generating a lane network representing the connection relationship between lanes of roads connected to each other.

BACKGROUND

Examples of information included in a high-precision map referred to by an autonomous vehicle driving system for autonomous driving control of a vehicle include a lane network representing the connection relationship between lanes, which is referred to for setting a planned trajectory of the vehicle under autonomous driving control. Thus, techniques to generate a lane network have been proposed (see Japanese Unexamined Patent Publications JP2010-26875A and JP2018-105636A).

Regarding a combination of an entry point and an exit point of an intersection between which travel is possible, a device for generating road network data disclosed in JP2010-26875A determines an intersection point of lines extending inside the intersection from lanes outside the intersection respectively connected with the entry point and the exit point. The device further sets a correction point between the entry point and the intersection point, and sets an arc of a quadratic Bézier curve, based on the three points, i.e., the intersection point, the correction point, and the exit point, as a lane inside the intersection.

A route generation device disclosed in JP2018-105636A obtains point sequence data including multiple points corresponding to the center line of a travel route being traveled by a host vehicle, based on map information and the position of the vehicle. The device obtains the center line by smoothing based on the point sequence data, and determines the obtained center line as a target trajectory of the vehicle. Specifically, the device extracts groups of point sequences each including adjacent points from the point sequence data, calculates the centroid positions of the respective extracted groups, and executes a smoothing process, based on the centroid positions, using a parametric curve, such as a Bézier, a B-spline, NURBS, or a spline interpolation curve.

SUMMARY

In the above-described techniques, a lane network is generated by referring to map information. Unfortunately, use of a lane network generated from map information for setting a target trajectory of a vehicle may cause an unnatural trajectory, because the lane network is generated without taking account of motion of vehicles.

It is an object of the present invention to provide an apparatus that can generate a lane network suitable for travel by vehicles.

According to an embodiment, an apparatus for generating a lane network is provided. The apparatus includes a processor configured to: calculate, for each of individual points in a predetermined region connecting a plurality of roads, a probability distribution indicating a probability that the point lies on a standard trajectory, based on trajectories of one or more vehicles that traveled from an entry lane for entering the region in one of the plurality of roads to an exit lane for exiting the region in another of the plurality of roads, generate two virtual borders each connecting the positions of respective edges of the entry lane and the exit lane, set, of the individual points in the predetermined region, at least two points that lie between the two virtual borders and at which the variance of the probability distribution is not greater than a predetermined variance threshold, as control points, generate a Bézier curve, based on the at least two control points, and determine the generated Bézier curve as a line connecting the entry lane and the exit lane in the predetermined region.

The processor of the apparatus preferably generates Bézier curves each connecting the positions of respective edges of the entry lane and the exit lane as the two virtual borders.

According to another embodiment, a method for generating a lane network is provided. The method includes calculating, for each of individual points in a predetermined region connecting a plurality of roads, a probability distribution indicating a probability that the point lies on a standard trajectory, based on trajectories of one or more vehicles that traveled from an entry lane for entering the region in one of the plurality of roads to an exit lane for exiting the region in another of the plurality of roads; generating two virtual borders each connecting the positions of respective edges of the entry lane and the exit lane; setting, of the individual points in the predetermined region, at least two points that lie between the two virtual borders and at which the variance of the probability distribution is not greater than a predetermined variance threshold, as control points; generating a Bézier curve, based on the at least two control points; and determining the generated Bézier curve as a line connecting the entry lane and the exit lane in the predetermined region.

According to still another embodiment, a non-transitory recording medium that stores a computer program for generating a lane network is provided. The computer program includes instructions causing a computer to execute a process including calculating, for each of individual points in a predetermined region connecting a plurality of roads, a probability distribution indicating a probability that the point lies on a standard trajectory, based on trajectories of one or more vehicles that traveled from an entry lane for entering the region in one of the plurality of roads to an exit lane for exiting the region in another of the plurality of roads; generating two virtual borders each connecting the positions of respective edges of the entry lane and the exit lane; setting, of the individual points in the predetermined region, at least two points that lie between the two virtual borders and at which the variance of the probability distribution is not greater than a predetermined variance threshold, as control points; generating a Bézier curve, based on the at least two control points; and determining the generated Bézier curve as a line connecting the entry lane and the exit lane in the predetermined region.

The apparatus according to the present disclosure has an advantageous effect of being able to generate a lane network suitable for travel by vehicles.

DESCRIPTION OF EMBODIMENTS

An apparatus for generating a lane network, a method therefor executed by the apparatus, and a computer program therefor will now be described with reference to the attached drawings. Regarding a region connected with roads, such as an intersection, the apparatus generates a lane network representing the connection relationship between lanes of the roads connected to the region, based on actual trajectories collected from one or more vehicles.

More specifically, for each of individual points in a predetermined intersection, the apparatus calculates a probability distribution indicating a probability that the point lies on a standard trajectory, based on trajectories of one or more vehicles that traveled between two lanes of interest at the intersection. In addition, the apparatus generates two virtual borders each connecting the positions of respective edges of the two lanes. Of the individual points at which the probability distributions are calculated, the apparatus identifies a sequence of points that lies between the two virtual borders and at which the variance of the probability distribution is not greater than a predetermined variance threshold, and sets at least two points included in the identified sequence of points as control points. The apparatus then generates a Bézier curve, based on the at least two control points, and determines the generated Bézier curve as a line connecting the two lanes in the intersection in a lane network.

Figure 1:
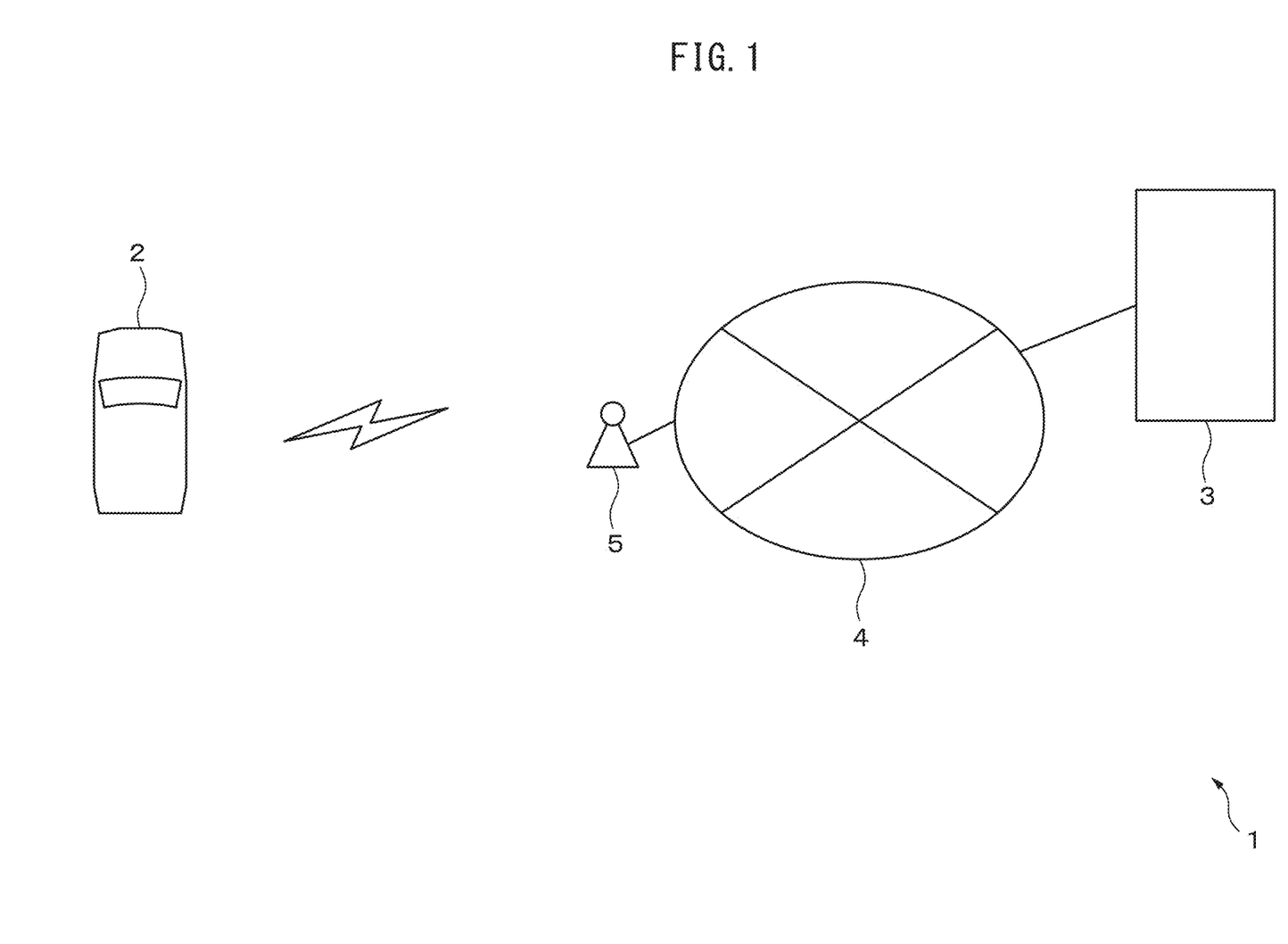
FIG. 1 schematically illustrates the configuration of a map generation system equipped with an apparatus for generating a lane network.

FIG. 1 schematically illustrates the configuration of a map generation system equipped with the apparatus for generating a lane network. In the present embodiment, the map generation system 1 includes at least one vehicle 2 and a server 3, which is an example of the apparatus for generating a lane network. Each vehicle 2 accesses a wireless base station 5, which is connected, for example, via a gateway (not illustrated) to a communication network 4 connected with the server 3, thereby connecting to the server 3 via the wireless base station 5 and the communication network 4. For simplicity, FIG. 1 illustrates only a single vehicle 2, but the map generation system 1 may include multiple vehicles 2. FIG. 1 also illustrates only a single wireless base station 5, but the communication network 4 may be connected with multiple wireless base stations 5.

The vehicle 2 includes a GPS receiver, a trajectory recorder, and a wireless communication terminal. The GPS receiver receives GPS signals from GPS satellites at predetermined intervals, and determines the position of the vehicle 2, based on the received GPS signals. The GPS receiver outputs positioning information indicating the result of determination of the position of the vehicle 2 based on the GPS signals to the trajectory recorder via an in-vehicle network at predetermined intervals. The vehicle 2 may include a receiver conforming to a satellite positioning system other than the GPS receiver. In this case, this receiver determines the position of the vehicle 2.

The trajectory recorder includes, for example, a processor and a memory. The processor of the trajectory recorder generates trajectory information, which indicates a trajectory along which the vehicle 2 traveled, by arranging the positions of the vehicle 2 indicated by positioning information obtained from the GPS receiver in chronological order, and stores the generated trajectory information in the memory of the trajectory recorder. The trajectory recorder may include identifying information of the vehicle 2 in the trajectory information.

The vehicle 2 may include a camera for taking pictures of a region around the vehicle 2. The camera may generate images representing the region around the vehicle 2 at predetermined intervals, and output the generated images to the trajectory recorder via the in-vehicle network. In this case, whenever an image is received from the camera, the processor of the trajectory recorder detects features on or around a road being traveled by the vehicle 2 from the image. The processor of the trajectory recorder further obtains odometry information of the vehicle 2 from an electronic control unit (not illustrated) that controls travel by the vehicle 2, and determines the amount of travel and the change in orientation of the vehicle 2 between the interval of generation of images. The processor of the trajectory recorder may then estimate the positions of the vehicle 2 at the times of generation of respective images, based on the features detected from the images and the amount of travel and the change in orientation of the vehicle 2 between the interval of generation of images, in accordance with the technique of "structure from motion (SfM)." The processor of the trajectory recorder may then generate the trajectory information by arranging the positions of the vehicle 2 at the times of generation of respective images in chronological order.

At a predetermined timing, the trajectory recorder outputs the generated trajectory information to the wireless communication terminal. The predetermined timing may be, for example, the timing when an ignition switch of the vehicle 2 is turned off, or timings at certain intervals (e.g., 30 minutes to 1 hour) after the ignition switch of the vehicle 2 is turned on. Alternatively, collection region information indicating a target region for collecting trajectories may be previously notified to the vehicle 2 from the server 3 via the communication network 4 and the wireless base station 5. In this case, the trajectory recorder may determine the timing when the vehicle 2 moves outside the target region for collection as the predetermined timing, by referring to the collection region information and the positioning information.

The wireless communication terminal is a device to execute a wireless communication process conforming to a predetermined standard of wireless communication, and accesses, for example, the wireless base station 5 to connect to the server 3 via the wireless base station 5 and the communication network 4. The wireless communication terminal generates an uplink radio signal including trajectory information received from the trajectory recorder, and transmits the uplink radio signal to the wireless base station 5 to transmit the trajectory information to the server 3. In addition, the wireless communication terminal receives a downlink radio signal from the wireless base station 5, and passes collection region information from the server 3 included in the radio signal to the trajectory recorder.

The following describes the server 3, which is an example of the apparatus for generating a lane network.

Figure 2:
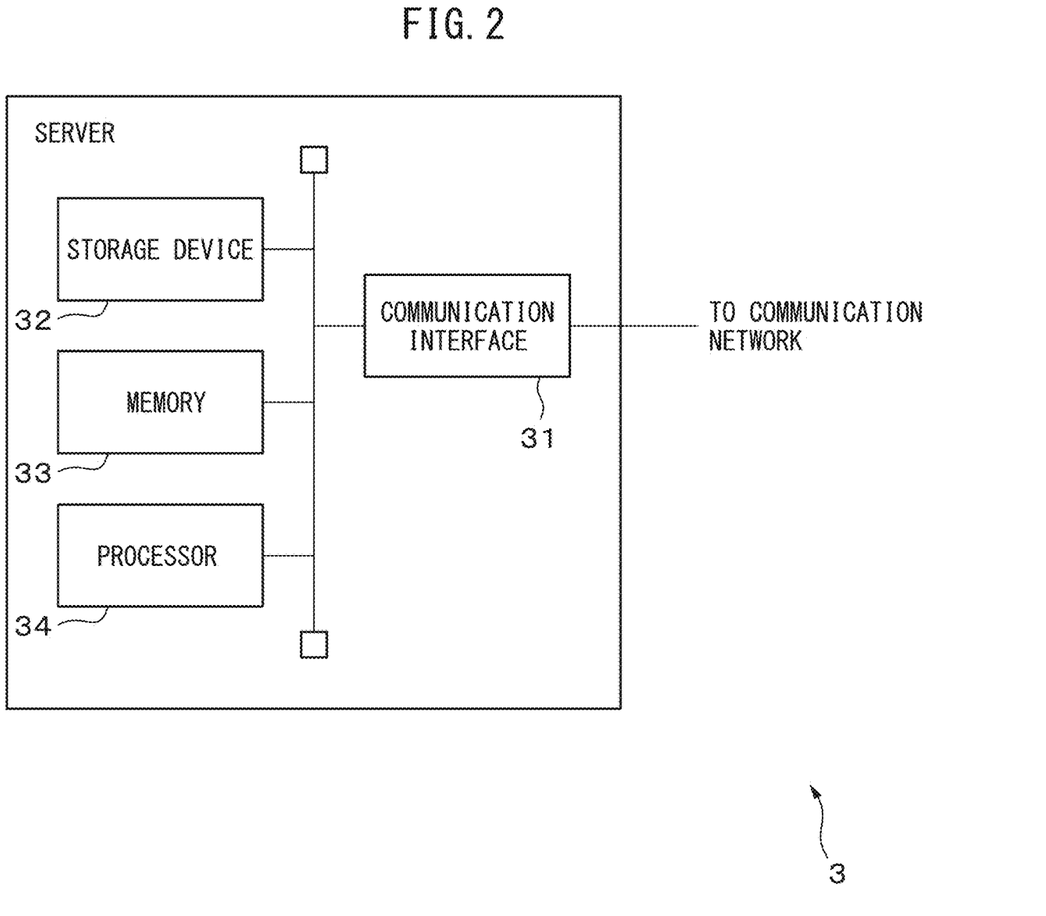
FIG. 2 illustrates the hardware configuration of a server, which is an example of the apparatus for generating a lane network.

FIG. 2 illustrates the hardware configuration of the server 3, which is an example of the apparatus for generating a lane network. The server 3 includes a communication interface 31, a storage device 32, a memory 33, and a processor 34. The communication interface 31, the storage device 32, and the memory 33 are connected to the processor 34 via a signal line. The server 3 may further include an input device, such as a keyboard and a mouse, and a display device, such as a liquid crystal display.

The communication interface 31, which is an example of a communication unit, includes an interface circuit for connecting the server 3 to the communication network 4. The communication interface 31 is configured to be communicable with the vehicle 2 via the communication network 4 and the wireless base station 5. More specifically, the communication interface 31 passes to the processor 34 trajectory information received from the vehicle 2 via the wireless base station 5 and the communication network 4. In addition, the communication interface 31 transmits collection region information received from the processor 34 to the vehicle 2 via the communication network 4 and the wireless base station 5.

The storage device 32, which is an example of a storage unit, includes, for example, a hard disk drive, or an optical medium and an access device therefor, and stores various types of data and information used in a lane network generation process. For example, the storage device 32 stores a map to which information representing a lane network is added. The storage device 32 also stores trajectory information received from each vehicle 2. The storage device 32 may further store a computer program for the processor 34 to execute the lane network generation process.

The memory 33, which is another example of a storage unit, includes, for example, nonvolatile and volatile semiconductor memories. The memory 33 temporarily stores various types of data generated during execution of the lane network generation process.

The processor 34 includes one or more central processing units (CPUs) and a peripheral circuit thereof. The processor 34 may further include another operating circuit, such as a logic-arithmetic unit or an arithmetic unit. Whenever trajectory information is received from one of the vehicles 2, the processor 34 stores the received trajectory information in the storage device 32. In addition, the processor 34 executes the lane network generation process.

Figure 3:
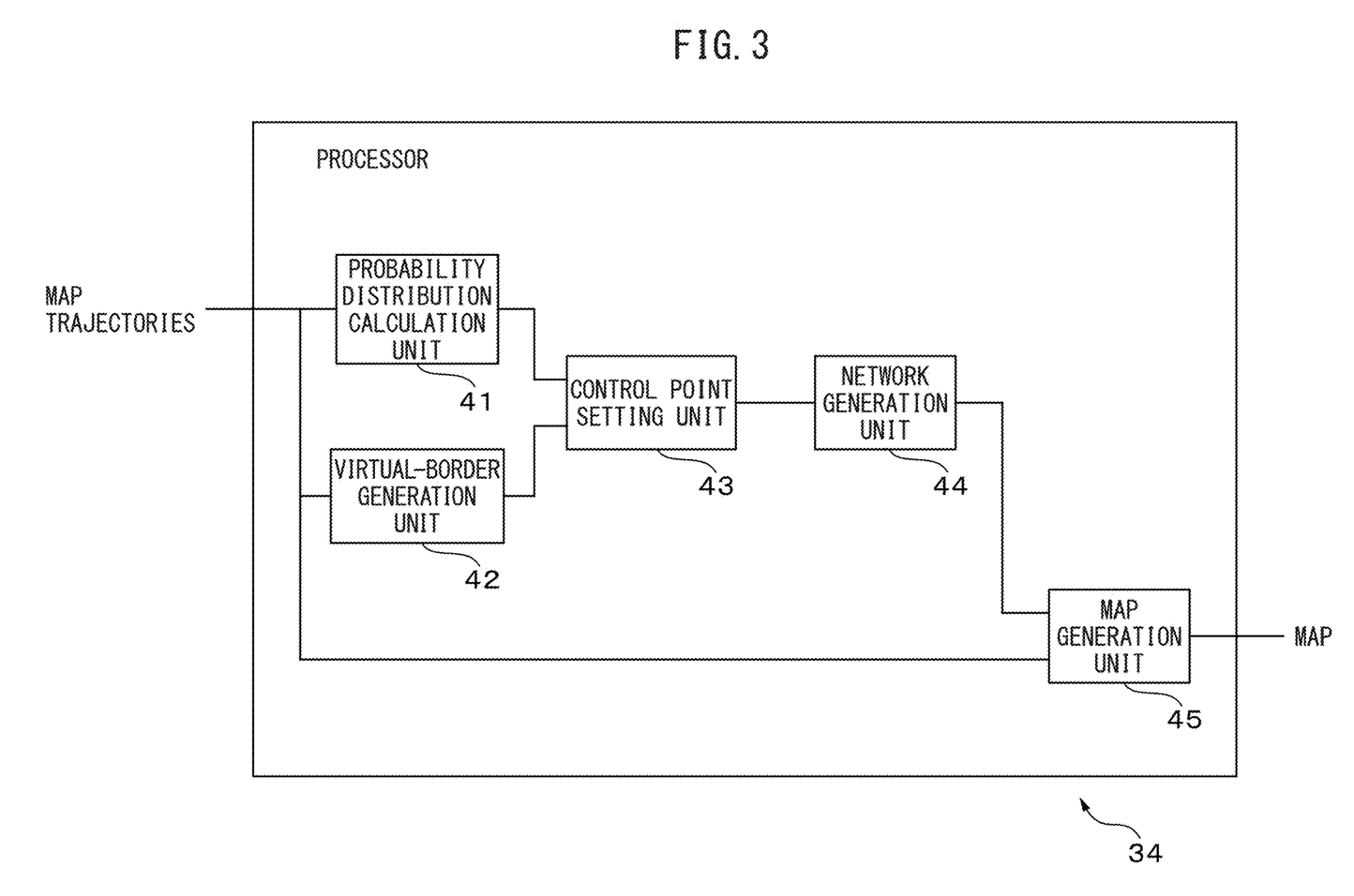
FIG. 3 is a functional block diagram of a processor, related to a lane network generation process.

FIG. 3 is a functional block diagram of the processor 34, related to the lane network generation process. The processor 34 includes a probability distribution calculation unit 41, a virtual-border generation unit 42, a control point setting unit 43, a network generation unit 44, and a map generation unit 45. These units included in the processor 34 are functional modules, for example, implemented by a computer program executed by the processor 34, or may be dedicated operating circuits provided in the processor 34.

The probability distribution calculation unit 41 identifies, among roads connected to an intersection that is a target for generating a lane network, a lane in a road of interest along which the vehicle 2 is allowed to enter the intersection and a lane in another road of interest along which the vehicle 2 exits the intersection. In the following, a lane along which the vehicle 2 is allowed to enter an intersection will be referred to simply as an "entry lane," and a lane along which the vehicle 2 exits the intersection as an "exit lane." For each point in the intersection, the probability distribution calculation unit 41 calculates a predetermined probability distribution, based on multiple pieces of trajectory information at the times of travel by the vehicle 2 from the entry lane to the exit lane of interest. The predetermined probability distribution indicates a probability that each point lies on a standard trajectory of a vehicle that travels from the entry lane to the exit lane of interest. The standard trajectory is supposed to be a trajectory for the case where a vehicle travels from the entry lane to the exit lane of interest in the intersection at a standard speed without any particular avoidance action.

Of the pieces of trajectory information stored in the storage device 32, the probability distribution calculation unit 41 identifies pieces of trajectory information indicating trajectories passing through that area represented in the map which corresponds to the entry lane and the exit lane of the intersection of interest. The probability distribution calculation unit 41 then identifies the trajectories indicated by the identified individual pieces of trajectory information as the trajectories of the vehicle 2 that traveled from the entry lane of interest to the exit lane of interest. The probability distribution calculation unit 41 reads out the identified pieces of trajectory information from the storage device 32.

The probability distribution calculation unit 41 calculates a predetermined probability distribution for each point in the intersection, based on the trajectories indicated by the pieces of trajectory information read from the storage device 32. In the present embodiment, the probability distribution of each point is assumed to follow the Gaussian process. Thus the predetermined probability distribution may be a two-dimensional Gaussian distribution parallel to the road surface.

The probability distribution calculation unit 41 calculates a probability distribution for each point in the intersection by referring to the trajectories in accordance with a calculation technique of a regression model of the Gaussian process, e.g., a technique with Bayesian inference. More specifically, the probability distribution calculation unit 41 sets a two-dimensional Gaussian distribution having a predetermined variance-covariance matrix as an initial probability distribution for each point in the intersection. The probability distribution calculation unit 41 then calculates a posterior probability distribution for each point in the intersection, based on individual points on the trajectories, with the set Gaussian distribution used as a prior probability distribution. The probability distribution calculation unit 41 then updates the variance-covariance matrix according to the calculated posterior probability distribution for each point in the intersection, thereby calculating a probability distribution for each point in the intersection. The average position of the probability distribution calculated for each point, i.e., the probability value at the point indicates a probability that the point lies on a standard trajectory. In addition, the variance-covariance matrix of the probability distribution indicates the degree of an observational error for the case where the point lies on a standard trajectory, and larger values of the elements of the variance-covariance matrix indicate a larger observational error. Thus, at a point passed by more trajectories, the probability value at the average position is larger, and the elements of the variance-covariance matrix have smaller values.

The probability distribution calculation unit 41 notifies the control point setting unit 43 of the probability distribution calculated for each point.

The virtual-border generation unit 42 identifies the positions of the widthwise separated edges of the entry lane and the exit lane of interest at the points where these lanes are connected to the intersection, by referring to the map. The virtual-border generation unit 42 then determines an endpoint of the entry lane of interest and an endpoint of the exit lane of interest as a pair, and the other endpoint of the entry lane and the other endpoint of the exit lane as another pair. The virtual-border generation unit 42 sets these pairs so that the lines connecting the endpoints of the entry lane and the exit lane included in the respective pairs do not cross.

For each pair, the virtual-border generation unit 42 generates a Bézier curve connecting the endpoints of the entry lane and the exit lane. Specifically, for each pair, the virtual-border generation unit 42 extends the boundary of the entry lane passing through the endpoint of the entry lane and the boundary of the exit lane passing through the endpoint of the exit lane into the intersection (the boundaries are defined, for example, by lane-dividing lines or curbstones). For each pair, the virtual-border generation unit 42 determines the intersection point of the extension lines of the boundaries on the entry lane side and the exit lane side, and sets control points at the midpoint between the intersection point and the endpoint on the entry lane side and at the midpoint between the intersection point and the endpoint on the exit lane side. For each pair, the virtual-border generation unit 42 then generates a Bézier curve connecting the endpoint on the entry lane side and the endpoint on the exit lane side as the virtual border, based on the set control points.

Figure 4:
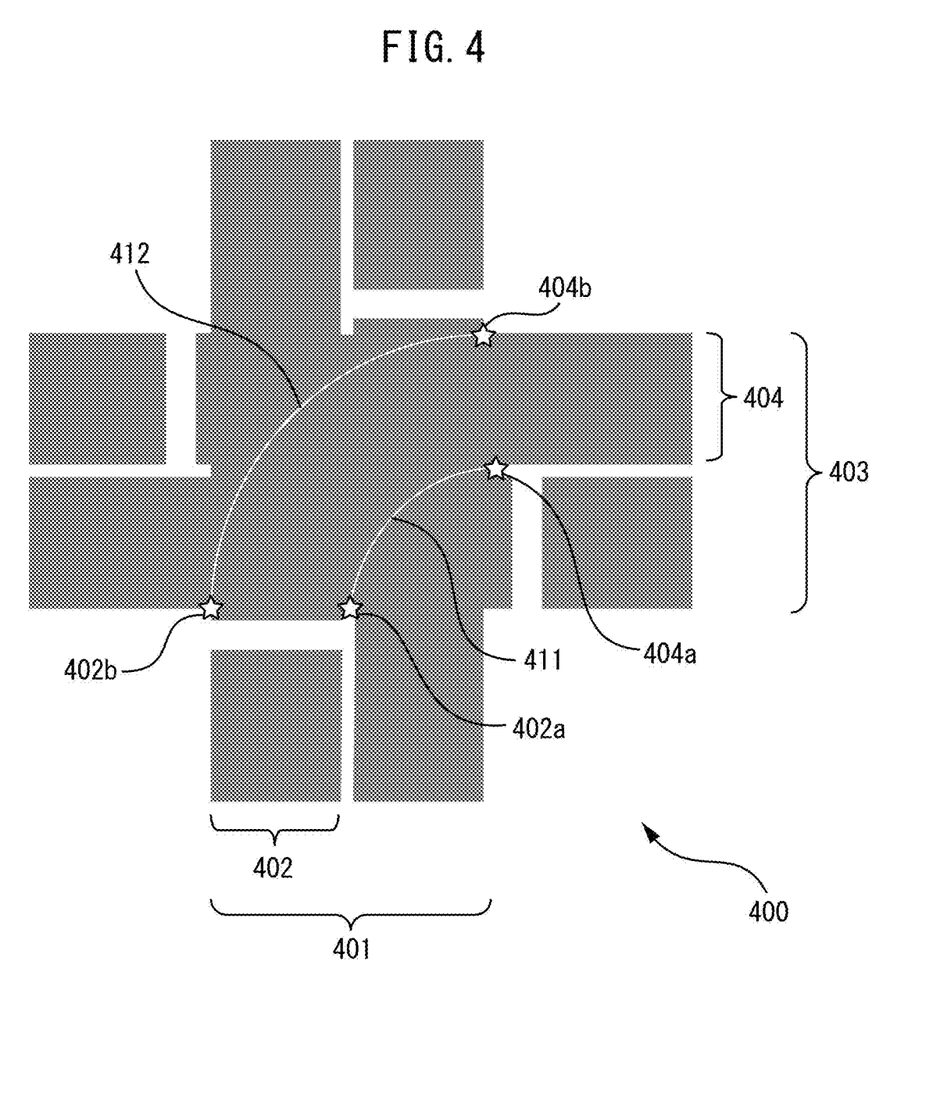
FIG. 4 illustrates an example of Bézier curves connecting endpoints of an entry lane and an exit lane.

FIG. 4 illustrates an example of Bézier curves connecting endpoints of an entry lane and an exit lane. In FIG. 4, roads are connected to an intersection 400 from the top, bottom, left, and right. Assume that, of these roads, the entry lane 402 of the road 401 connected to the intersection 400 from the bottom and the exit lane 404 of the road 403 connected to the intersection 400 from the right are an entry lane and an exit lane of interest, respectively. In this case, a Bézier curve 411 connecting the right endpoint 402a of the entry lane 402 and the lower endpoint 404a of the exit lane 404 as well as a Bézier curve 412 connecting the left endpoint 402b of the entry lane 402 and the upper endpoint 404b of the exit lane 404 are generated as virtual borders. The virtual borders 411 and 412 each connect the endpoints of the entry lane 402 and the exit lane 404. Thus the region between the virtual borders 411 and 412 is assumed to correspond to a region through which vehicles heading for the exit lane 404 from the entry lane 402 pass. In other words, the virtual borders 411 and 412 are assumed to represent the boundaries of a region through which vehicles heading for the exit lane 404 from the entry lane 402 are supposed to pass (hereafter a "virtual passage region").

The virtual-border generation unit 42 notifies the control point setting unit 43 of the two generated virtual borders.

The control point setting unit 43 identifies a sequence of points that lies between the two virtual borders and at which the variance of the probability distribution is not greater than a predetermined variance threshold, among the individual points in the intersection. The control point setting unit 43 then sets at least two points included in the identified sequence of points as control points.

The control points are preferably at the positions where there are small variations in position between trajectories in the direction perpendicular to the travel direction of the vehicle 2 that traveled from the entry lane to the exit lane of interest. Thus the control point setting unit 43 determines a reference line connecting the midpoint of the entry lane of interest and that of the exit lane of interest. The reference line may be, for example, a straight line or a circular arc curving around the center of the intersection. For each point in the intersection, the control point setting unit 43 calculates the position on the reference line closest from the point, and determines the tangential direction of the reference line at the calculated position. For each point in the intersection, the control point setting unit 43 affine-transforms the probability distribution at the point into that in an orthogonal coordinate system having axes in the tangential direction at the position on the reference line closest from the point and the direction perpendicular to the tangential direction. For each point in the intersection, the control point setting unit 43 then compares the value of the element of the variance-covariance matrix in the perpendicular direction of the probability distribution after the affine transformation, as the value of the variance, with the variance threshold.

The control point setting unit 43 may divide the region in the intersection into multiple (e.g., 5 to 10) sections along the straight line connecting the midpoint of the entry lane of interest and that of the exit lane of interest. The control point setting unit 43 may then set two or more points respectively included in different sections among the points in the sequence of points as the control points. This prevents the control points from being too close to each other.

Use of points such that the variance is not greater than the predetermined variance threshold as the control points causes the control point setting unit 43 to set the control points at positions that every vehicle traveling from the entry lane to the exit lane of interest probably passes. In addition, setting the control points in the virtual passage region enables the control point setting unit 43 to prevent determining a position on an abnormal trajectory of the vehicle 2 that took, for example, a wide turn or a shortcut from the entry lane to the exit lane of interest for some reason, as a control point.

The control point setting unit 43 notifies the network generation unit 44 of the positions of the set control points.

The network generation unit 44 generates a Bézier curve for the intersection, which is a target for generating a lane network, based on the at least two control points set by the control point setting unit 43, and determines the generated Bézier curve as a line connecting the entry lane and the exit lane of interest in the intersection in a lane network. Use of the control points set as described above enables the network generation unit 44 to generate a lane network with a curve that smoothly connects the entry lane and the exit lane of interest and that is close to an actual trajectory of a vehicle.

Figure 5:
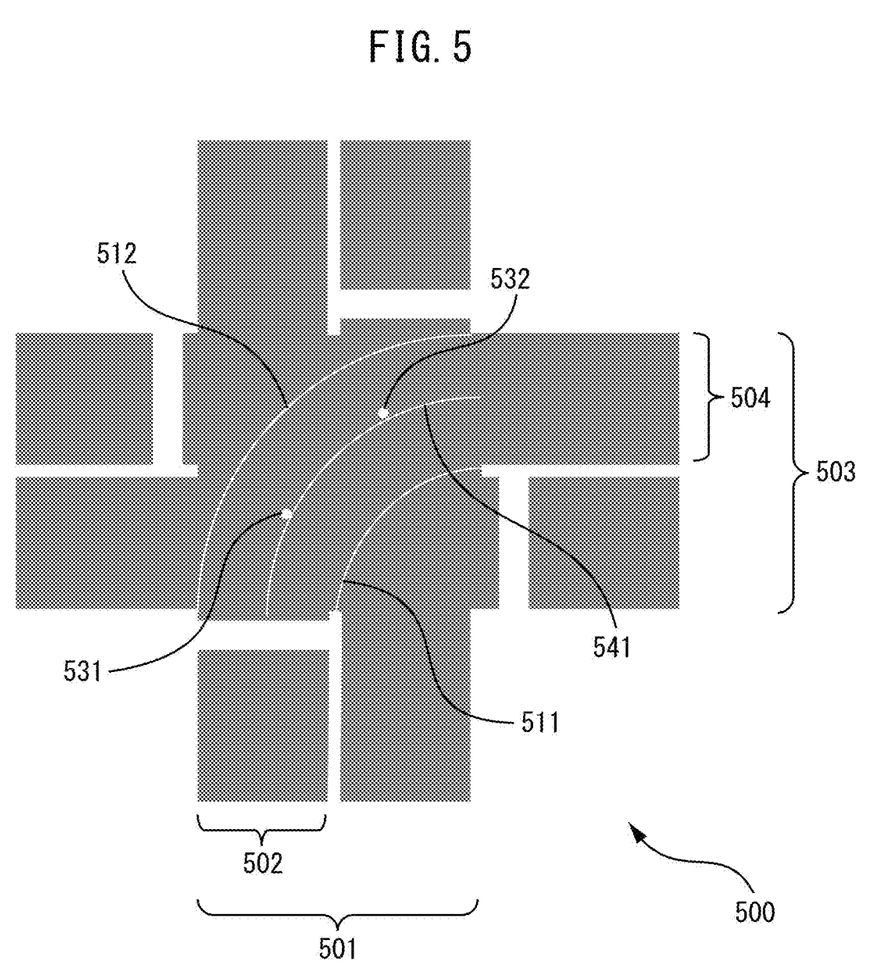
FIG. 5 illustrates an example of setting of control points and generation of a lane network.

FIG. 5 illustrates an example of setting of control points and generation of a lane network. In FIG. 5, roads are connected to an intersection 500 from the top, bottom, left, and right, as in the intersection illustrated in FIG. 4. Assume that, of these roads, the entry lane 502 of the road 501 connected to the intersection 500 from the bottom and the exit lane 504 of the road 503 connected to the intersection 500 from the right are an entry lane and an exit lane of interest, respectively. Of the individual points between two virtual borders 511 and 512 connecting the endpoints of the entry lane 502 and the exit lane 504 in the intersection 500, the variances of the probability distributions whose average positions are at points 531 and 532, respectively, are not greater than the variance threshold. Hence the points 531 and 532 are set as control points; and a Bézier curve 541 generated on the basis of the control points 531 and 532 is a line connecting the entry lane 502 and the exit lane 504 and constituting a lane network.

The network generation unit 44 outputs information representing the generated lane network to the map generation unit 45.

The map generation unit 45 generates a map including information representing a lane network for each intersection area. More specifically, the map generation unit 45 adds information representing a lane network generated by the network generation unit 44, for each intersection represented in the map read from the storage device 32. In this way, a map including lane networks is generated.

The map generation unit 45 stores the generated map in the storage device 32. Alternatively, the map generation unit 45 may output the generated map to another device via the communication interface 31.

Figure 6:
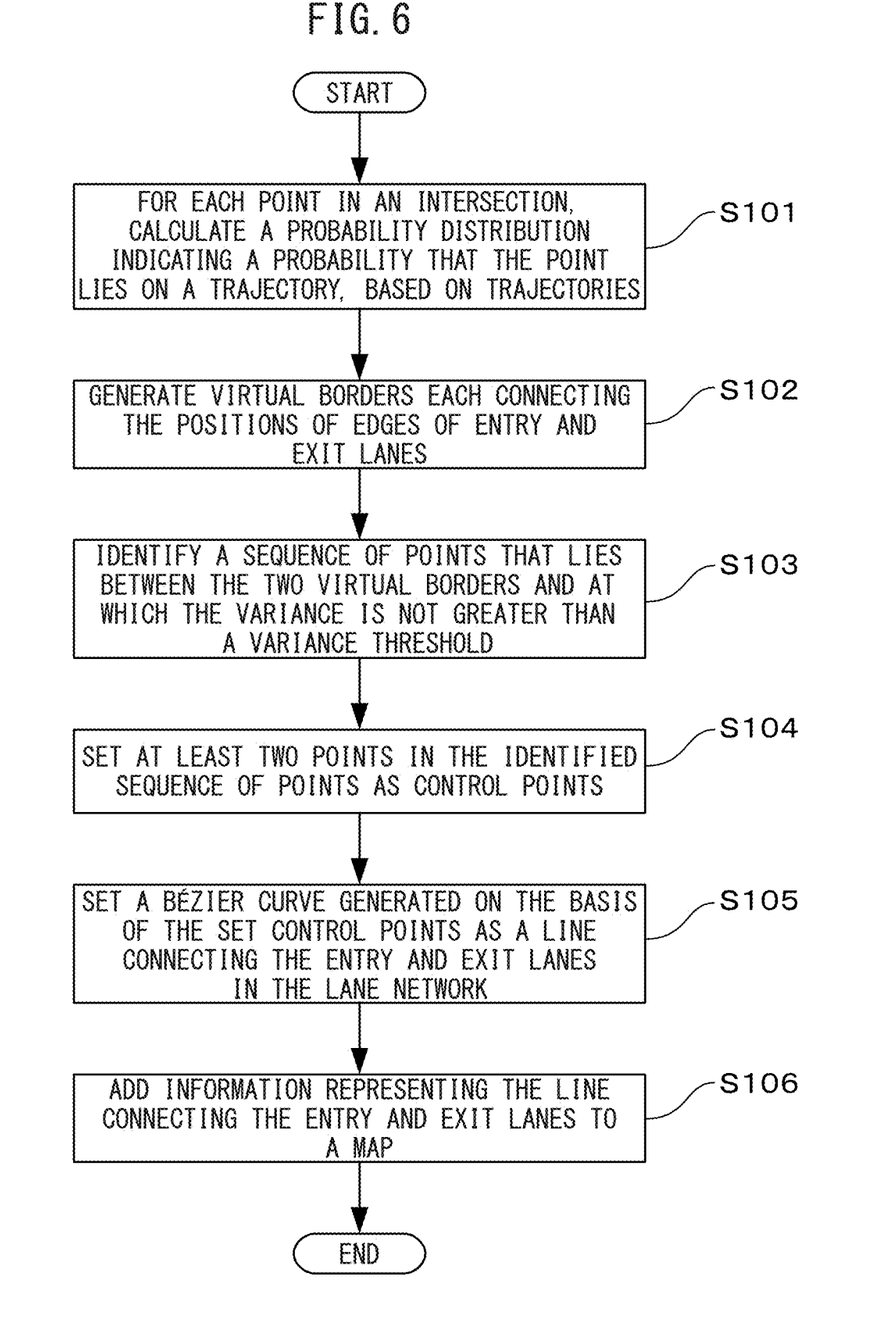
FIG. 6 is an operation flowchart of the lane network generation process.

FIG. 6 is an operation flowchart of the lane network generation process by the server 3. For each set of an entry lane and an exit lane of interest at an intersection that is a target for generating a lane network, the processor 34 of the server 3 executes the lane network generation process in accordance with the operation flowchart described below.

For each of individual points in the intersection, the probability distribution calculation unit 41 of the processor 34 calculates a probability distribution indicating a probability that the point lies on a trajectory, based on trajectories from the entry lane to the exit lane of interest (step S101).

The virtual-border generation unit 42 of the processor 34 generates Bézier curves each connecting the positions of the widthwise separated edges of the entry lane and the exit lane of interest at the points where these lanes are connected to the intersection, as virtual borders (step S102).

Of the individual points in the intersection, the control point setting unit 43 of the processor 34 identifies a sequence of points that lies between the two virtual borders and at which the variance of the probability distribution is not greater than a predetermined variance threshold (step S103). The control point setting unit 43 then sets at least two points included in the identified sequence of points as control points (step S104).

The network generation unit 44 of the processor 34 generates a Bézier curve, based on the at least two set control points, and determines the generated Bézier curve as a line connecting the entry lane and the exit lane of interest in the lane network (step S105). The map generation unit 45 of the processor 34 adds information representing the line connecting the entry lane and the exit lane of interest to a map (step S106). The processor 34 then terminates the lane network generation process.

As has been described above, the apparatus for generating a lane network calculates, for each of individual points in an intersection that is a target for generating a lane network, a probability distribution indicating a probability that the point lies on a trajectory, based on trajectories from an entry lane to an exit lane of interest of the intersection. Of the individual points in the intersection, the apparatus further sets at least two points that lie in a virtual passage region and at which the variance of the probability distribution is not greater than a variance threshold, as control points. The apparatus then determines a Bézier curve generated on the basis of the set control points as a line connecting the entry lane and the exit lane of interest in the lane network. In this way, the apparatus can generate a lane network suitable for travel by vehicles.

According to a modified example, the virtual-border generation unit 42 may generate lines other than Bézier curves as the virtual borders connecting the endpoints of an entry lane and an exit lane of interest. For example, the virtual-border generation unit 42 may determine circular arcs or spline curves that connect the endpoints of the entry lane and the exit lane of interest and that curve around the center of the intersection, as the virtual borders. Alternatively, the virtual-border generation unit 42 may generate clothoid curves that curve around the center of the intersection and whose curvature increases with the distance from the endpoints of the entry lane and the exit lane of interest, as the virtual borders connecting the endpoints of the entry lane and the exit lane.

A road region that is a target for generating a lane network according to the embodiment or modified example is not limited to an intersection, and may be a region where a road is connected with another road, such as a divergent point or a merging point. In this case also, the apparatus can generate a lane network by executing a process similar to that in the embodiment or modified example for each set of an entry lane and an exit lane of interest.

The computer program for causing a computer to achieve the functions of the units included in the processor of the apparatus for generating a lane network according to the embodiment or modified example may be provided in a form recorded on a computer-readable medium. The computer-readable medium may be, for example, a magnetic medium, an optical medium, or a semiconductor memory.

As described above, those skilled in the art may make various modifications according to embodiments within the scope of the present invention.

What is claimed is:

1. An autonomous vehicle control apparatus, the apparatus comprising:
   a communication interface configured to receive, trajectory information wirelessly transmitted from one or more vehicles, wherein the one or more vehicles each traveled through a region connecting a plurality of roads from an entry lane for entering the region on one of the plurality of roads to an exit lane for exiting the region on another of the plurality of roads;
   a memory storing a computer program; and
   a processor configured to execute the computer program and to thereby:
      calculate, for each of individual points in the region, a probability distribution indicating a probability that the point lies on a standard trajectory, based on the trajectory information from the one or more vehicles,
      generate two virtual borders each connecting the positions of respective edges of the entry lane and the exit lane,
      set, of the individual points in the region, at least two points that lie between the two virtual borders and at which the variance of the probability distribution is not greater than a predetermined variance threshold, as control points,
      generate a Bézier curve, based on the at least two control points,
      determine a lane network comprising the generated Bézier curve connecting the entry lane and the exit lane,
      generate a map comprising the lane network, and
      control a vehicle trajectory according to the map comprising the lane network.

2. The apparatus according to claim 1, wherein the processor is configured to generate the two virtual borders by generating Bézier curves each connecting the positions of respective edges of the entry lane and the exit lane.

3. An autonomous vehicle control method comprising:
   receiving, via a communication interface, trajectory information wirelessly transmitted from one or more vehicles, wherein the one or more vehicles each traveled through a region connecting a plurality of roads from an entry lane for entering the region on one of the plurality of roads to an exit lane for exiting the region on another of the plurality of roads;
   calculating, for each of individual points in the region, a probability distribution indicating a probability that the point lies on a standard trajectory, based on the trajectory information from the one or more vehicles;

generating two virtual borders each connecting the positions of respective edges of the entry lane and the exit lane;

setting, of the individual points in the region, at least two points that lie between the two virtual borders and at which the variance of the probability distribution is not greater than a predetermined variance threshold, as control points;

generating a Bézier curve, based on the at least two control points;

determining a lane network comprising the generated Bézier curve connecting the entry lane and the exit lane, generating a map comprising the lane network, and controlling a vehicle trajectory according to the map comprising the lane network.

4. A non-transitory recording medium that stores a computer program for autonomously controlling a vehicle according to a lane network, the computer program causing a computer to execute a process comprising:

receiving, via a communication interface, trajectory information wirelessly transmitted from one or more vehicles, wherein the one or more vehicles each traveled through a region connecting a plurality of roads from an entry lane for entering the region on one of the plurality of roads to an exit lane for exiting the region on another of the plurality of roads;

calculating, for each of individual points in the region, a probability distribution indicating a probability that the point lies on a standard trajectory, based on the trajectory information from the one or more vehicles;

generating two virtual borders each connecting the positions of respective edges of the entry lane and the exit lane;

setting, of the individual points in the region, at least two points that lie between the two virtual borders and at which the variance of the probability distribution is not greater than a predetermined variance threshold, as control points;

generating a Bézier curve, based on the at least two control points;

determining a lane network comprising the generated Bézier curve connecting the entry lane and the exit lane, generating a map comprising the lane network, and controlling a vehicle according to the map comprising the lane network.

\* \* \* \* \*